United States Patent
Teske

[11] 3,756,434
[45] Sept. 4, 1973

[54] APPARATUS FOR CONVEYING BULK MATERIAL BETWEEN AREAS UNDER DIFFERENT GAS PRESSURES

[75] Inventor: Lothar Teske, Porz-Westhoven, Germany

[73] Assignee: Maschinenbau Louise GmbH, Westhoven, Germany

[22] Filed: July 16, 1971

[21] Appl. No.: 163,163

[30] Foreign Application Priority Data
May 12, 1971 Great Britain.................. 14,572/71

[52] U.S. Cl................. 214/17 B, 222/55, 222/413, 302/50
[51] Int. Cl.......................... B65g 65/30, B67d 5/08
[58] Field of Search..................... 222/55, 413, 409; 141/67, 68; 214/17 B; 198/64, 213; 302/50

[56] References Cited
UNITED STATES PATENTS

| | | | |
|---|---|---|---|
| 1,737,090 | 11/1929 | Meyers............................. | 214/17 B |
| 1,941,573 | 1/1934 | Morrow............................... | 302/50 |
| 2,014,617 | 9/1935 | Fischer.............................. | 214/17 B |
| 2,299,470 | 10/1942 | Davis.................................. | 302/50 |
| 2,321,015 | 6/1943 | Davis............................. | 214/17 B X |
| 2,374,363 | 4/1945 | McCaskell...................... | 222/55 X |
| 2,376,139 | 5/1945 | Hemminger.................. | 214/17 B X |
| 2,681,610 | 6/1954 | Schrock.......................... | 198/213 X |
| 3,341,280 | 9/1967 | Eolkin............................. | 214/17 B X |
| 3,602,552 | 8/1971 | Morgan............................ | 198/213 X |

FOREIGN PATENTS OR APPLICATIONS

| | | | |
|---|---|---|---|
| 1,209,061 | 1/1966 | Germany............................ | 214/17 B |
| 1,180,083 | 6/1959 | France.............................. | 214/17 B |
| 1,243,885 | 9/1960 | France................................. | 302/50 |
| 615,779 | 5/1933 | Germany............................. | 302/50 |
| 686,718 | 1/1953 | Great Britain........................ | 302/50 |

Primary Examiner—Robert S. Ward, Jr.
Attorney—Markva & Smith

[57] ABSTRACT

Bulk material conveying apparatus includes a tubular element connected between hoppers under different gas pressures. A rotary helical conveying worm extends through a portion of the tubular element to feed bulk material from one of the hoppers through the tubular element to the other hopper, the conveying worm compressing the bulk material to form a plug in the tubular element downstream from the end of the conveying worm to prevent flow of gas between the two hoppers. Gas pressure sensing means is provided for detecting any changes in pressure in one of the hoppers to control adjustment of the conveying worm in an axial direction in the tubular element whereby the size of the plug can be increased or decreased as necessary to maintain a predetermined pressure in the hopper.

8 Claims, 2 Drawing Figures

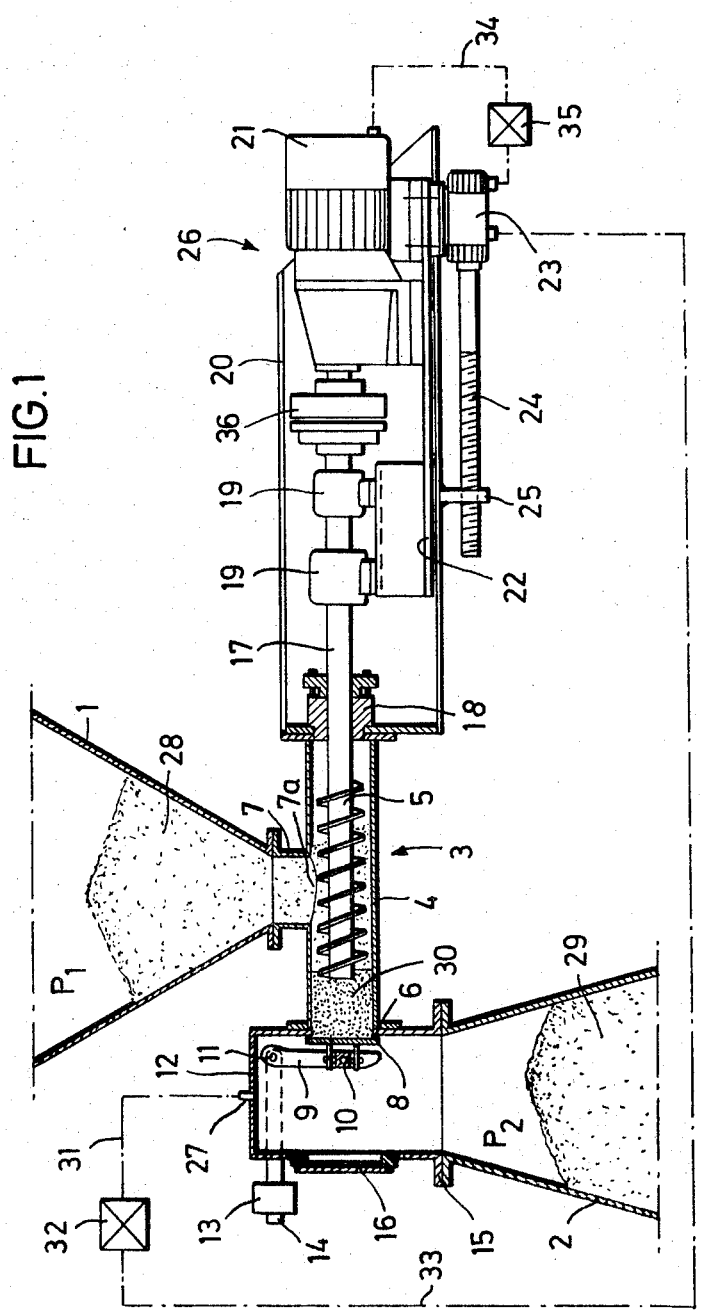

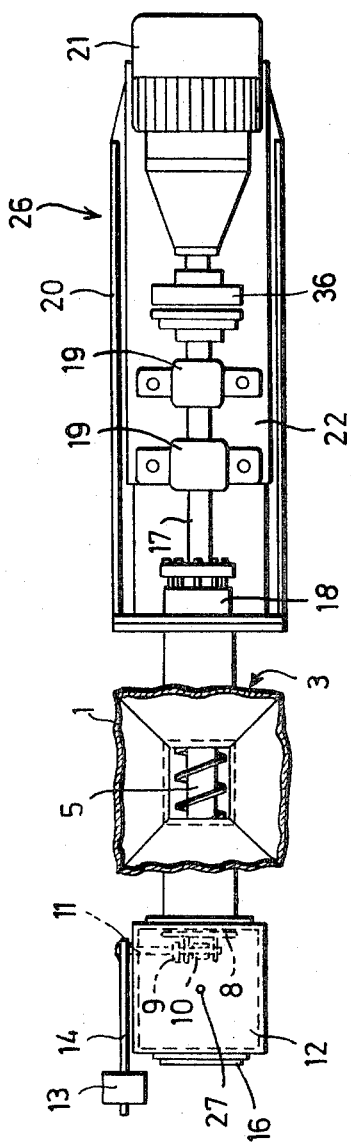

APPARATUS FOR CONVEYING BULK MATERIAL BETWEEN AREAS UNDER DIFFERENT GAS PRESSURES

This invention relates to an apparatus for conveying bulk material between two areas which are maintained at different gas pressures.

More specifically, the present invention relates to apparatus for transferring bulk material from one container such as a bunker which is under a positive or negative gas pressure to another container maintained under a different positive or negative pressure. A primary problem in transferring bulk material between containers maintained at different pressures is the prevention of gas flow between the containers through the conduit means used for transferring the bulk material between the containers.

Prior art devices designed to transfer bulk material between containers maintained at different pressures have included means for providing an air lock in the conduit used to transfer the bulk material. A rotatably driven conveying worm extends a part of the distance through the conduit and a pivoted flap is biased towards a sealing position against the downstream end of the conduit. With this arrangement, the conveying worm feeds bulk material from one container into the conduit to form a plug in the conduit downstream from the end of the conveying worm, the plug being continuously pushed by further bulk material fed into the conduit against the flap at the opposite end of the tubular element as it is forced into the other container. It will be appreciated that the plug is intended to serve as an air lock to prevent gas flow between the containers through the conduit.

A disadvantage of the prior art devices of this type is that the efficiency of the plug as an air lock to prevent gas flow depends upon the consistency of the bulk material and also upon the difference between the pressures in the respective containers. It has been found that some bulk materials are easily compressed and in fact form a cake-type plug. Other bulk materials which are usually free-flowing are difficult to compress in the form of a plug. Furthermore, the consistency of any particular bulk material will vary so that a constant seal obtained by the plug will not be maintained. The prior art devices have provided no means for compensating for the variations in the consistency of the bulk material to maintain a constant pressure in one or both of the containers.

It is an object of the present invention to provide an improved conveying means for bulk material wherein the efficiency of the air lock may be maintained irrespective of the consistency of the bulk material.

It is a further object of the invention to provide conveying apparatus wherein the length of the plug formed in the conduit may be varied depending upon the consistency of the bulk material being conveyed.

It is a still further object of this invention to provide an improved conveying means wherein adjustment is automatically made in the length of the plug in the conduit responsive to fluctuations in gas pressure in one of the containers.

Briefly, the present invention comprises a prior art apparatus of the type described above, but means is provided for moving the conveying worm axially so that the distance between the end of the conveying worm and the outlet end of the conduit may be correspondingly varied. It will be appreciated that with this arrangement the length of the plug in the conduit may be varied. In a preferred embodiment of the invention, gas pressure detecting means is provided for detecting fluctuations in pressure in one of the containers, and further means is provided responsive to the pressure detecting means for moving the conveying worm axially to change the length of the plug as necessary.

When the consistency of the bulk material is such that it will not compress easily, the conveying worm is moved in an axial direction to increase the length of the plug to form an airtight seal in the conduit. Conversely, if the bulk material can be compressed easily, a shorter plug is desirable; and therefore the conveying worm is moved axially in the opposite direction. It is undesirable for the plug length in the conduit to be unnecessarily long, since the power required to force the packed bulk material through the conduit may become excessive. If the bulk material packs easily and forms a cake-like plug, the power required to rotate the conveying worm will be increased; and if increased power is not available, the delivery rate for the bulk material will be decreased substantially, since proper rotational speed for the conveying worm cannot be maintained. It is therefore desirable to provide automatic pressure detecting means to control the position of the conveying worm in the conduit and thereby control the length of the plug so that a minimum plug length will always be maintained consistent with the maintenance of a gas-tight seal in the conduit.

The present invention is extremely desirable where a reliable seal is necessary to prevent toxic gases from flowing out of a container during removal of bulk material. This type of apparatus is also desirable in preventing the inflow of oxygen under certain circumstances which might give rise to the danger of explosions.

In order that the invention may be understood, reference will now be made to the drawing wherein an exemplary embodiment is shown. It is understood that variations may be made without departing from the scope of the invention as defined by the appended claims.

FIG. 1 is a side view partly in section of the bulk loading/unloading apparatus; and FIG. 2 is a plan view of the apparatus of FIG. 1.

In the embodiment shown, the loading/unloading apparatus is arranged to transfer bulk material 28 from bunker 1 which is maintained at a pressure $P_1$ to a second bunker 2 maintained at a different pressure $P_2$. An air lock head 12 is connected to the top of bunker 2 by flange 15 and includes a sealable aperture 16 and a front discharge aperture 6. A delivery pipe 4 extends horizontally from the front discharge aperture 6 to a housing 20 and contains a conveying worm 5 for transporting the bulk material along the delivery pipe 4 towards the air lock head 12. A union 7 communicates with the delivery pipe 4 above the conveying worm 5 to join the bottom of bunker 1 with the delivery pipe 4.

The front discharge aperture 6 is normally closed by a cover 8 to maintain a substantially air-tight seal. The cover 8 is secured through a universal joint 10 to one end of lever 9 while the opposite end of the lever 9 is mounted on rotatable shaft 11. The shaft 11 extends horizontally through the side wall of the air lock head 12 and an arm 14 is secured to the end of the shaft 11. A weight 13 is arranged to be longitudinally displaceable on the arm 14 and to be secured at any location along the arm. Thus, the cover 8 is biased towards the front discharge aperture 6 to seal the aperture and the amount of bias can be varied depending upon the distance of the weight 13 on arm 14 from the shaft 11.

The worm shaft 17 passes from the delivery pipe 4 through stuffing box 18 in housing 20 and through a pair of bearings 19. The shaft of a driving motor 21 is operatively connected to the end of the worm shaft 17 through coupling 36.

The pair of bearings 19 and the driving motor 21 are mounted on a common longitudinally displaceable plate 22 whereby the unit 26 which includes the longitudinally displaceable plate 22, driving motor 21, coupling 36, the pair of bearings 19 and the worm shaft 17 including the conveying worm 5 can be moved longitudinally in either direction. Thus, the conveying worm 5 can be moved in either direction through the delivery pipe 4 while it is simultaneously being rotatably driven by motor 21. The longitudinal displacement of the plate 22 is controlled by adjusting motor 23 which drives an externally threaded spindle 24 passing through an internally threaded nut 25 secured to the plate 22. The adjusting motor 23 is capable of being driven in either the forward or reverse directions for adjustment of the plate 22 and the conveying worm 5 in either longitudinal direction.

A pressure measuring device 27 is located in the wall of air lock head 12 for monitoring the pressure within bunker 2 which of course is effected by the amount of gas which may pass between the two bunkers through the delivery pipe 4. Rotation of the conveying worm 5 driven by motor 21 causes the bulk material 28 passing downwardly from the bunker 1 through the union 7 to be conveyed forwardly (to the left as viewed in FIG. 1) through the delivery pipe 4 and to be compressed to form a plug 30 between the end of the conveying worm 5 and the biased cover 8. The effectiveness of the plug 30 as an air lock to prevent air passage between bunkers 1 and 2 depends to a great extent upon the nature of the bulk material 28. A relatively short plug 30 is required where the bulk material is easily compressed. On the other hand, if the bulk material is not easily compressed, a substantially larger plug 30 will be required to obtain an equally effective air lock. When there is an undesirable rise or fall of air pressure in bunker 2, the pressure measuring device 27 transmits a signal through control circuits 31 and 33 and electrical transmission device 32 to actuate the adjusting motor 23. If the pressure in bunker 2 either increases or decreased above or below certain predetermined limits, these fluctuations will be sensed by the pressure monitoring device 27 and a signal will be transmitted to the adjusting motor 23 causing the longitudinally displaceable plate 22 and the conveying worm 5 to be moved forwardly or rearwardly as required to decrease or increase, respectively, the length of plug 30 in delivery pipe 4. The distance between the front discharge aperture 6 and the union 7 at the bottom of the bunker 1 is sufficiently great so that in no event will the end of the conveying worm 5 when moved rearwardly reach the location of the union 7 on the delivery pipe 4.

The motor 21 continues to drive the conveying worm 5 during movement of the longitudinally displaceable plate 22 by the adjusting motor 23. However, a further control circuit 34 leads from the adjusting motor 23 to the driving motor 21 for transmitting a signal by way of an amplifier device 35 which signal is dependent upon the direction of rotation of the adjusting motor 23. The signal causes the rotational speed of the motor 21 to be increased or decreased as required.

The control system permits the bulk material plug 30 to be continuously increased or reduced in length depending upon the pressure in bunker 2 as sensed by the pressure monitoring device 27. The result is the maintenance of a substantially constant pressure in bunker 2 irrespective of the nature of the bulk material 28 and its ability to be compressed and to serve as a plug. At the same time, the least possible load is placed on the driving motor 21 consistent with the maintenance of a maximum sealing effect. When the plug is required to be increased in length, the rotational speed of the driving motor is correspondingly increased to compensate for this greater length and conversely as the sealing plug 30 is reduced in length, the rotational speed of the driving motor 21 is reduced.

It will be appreciated the above described automatic adjusting means for both controlling the length of the bulk material plug and the rotational speed of the conveyor worm can also be manually regulated on the basis of readings taken from a pressure gauge substituted for the pressure monitoring device. Furthermore, it will be appreciated that though an arrangement has been described in which the pressure in bunker 2 serves to control the apparatus, the pressure measuring device can be arranged to sense fluctuations in pressure in bunker 1 and to control the apparatus in the same manner.

I claim:

1. Apparatus for conveying bulk material along a path between areas having different gas pressures while minimizing the flow of gas along said path between said areas comprising a. conduit means having inlet and outlet ends and extending between said two areas,
   b. means extending into the inlet end and a part of the distance through said conduit means for feeding said bulk material from one of said areas into the inlet end of said conduit means, for compressing said bulk material in said conduit means to form a gas-tight plug downstream from said feed means, and for pushing said plug along said conduit means and through the outlet end of said conduit means into the other of said areas,
   c. means for adjusting the distance said feed means extends through said conduit means, and
   d. means for sensing the gas pressure in one of said areas and for regulating said adjusting means,
   e. whereby the length of said plug in said conduit means between the end of said feed means and said outlet end may be adjusted and maintained at a minimum length required to maintain its effectiveness in minimizing flow of gas depending upon the degree of difference in gas pressure between the two areas and the consistency of the bulk material.

2. Apparatus as defined in claim 1 wherein said conduit means comprises a tubular element and said feed means comprises a rotary helical conveying worm, said adjusting means comprising means for moving said conveying worm in either direction along its axis.

3. Apparatus as defined in claim 1 further comprising means for sealing the outlet end of said conduit means adjacent the other of said areas, means mounting said sealing means for movement towards and away from a sealing position, and means biasing said sealing means towards said sealing position whereby the formed plug in said conduit means will move said sealing means away from said sealing position when said plug passes through said outlet into the other of said areas.

4. Apparatus as defined in claim 1 further comprising a first gas-tight hopper communicating with the outlet end of said conduit means for receiving said bulk material and a second gas-tight hopper communicating with the inlet end of said conduit means for retaining bulk material to be fed through said conduit means into said first gas-tight hopper.

5. Apparatus as defined in claim 2 further comprising drive means for rotating said conveying worm and means responsive to said pressure sensing means for controlling the rate of rotation of said conveying worm whereby the bulk material is continuously compressed to form said plug, the rotational speed of said conveying worm being increased when moved away from said outlet end and decreased when moved towards said outlet end.

6. Apparatus according to claim 2 further comprising means for rotatably supporting said conveying worm, said means for moving said worm along said axis comprising means for moving said support means parallel to said axis.

7. Apparatus as defined in claim 2 wherein said pressure sensing means is adapted to sense the pressure in the area at the outlet end of said tubular element.

8. Apparatus as defined in claim 3 wherein said sealing means comprises a closure flap, means pivotally mounting said closure flap and adjustable weight means of adjusting the amount of bias applied to the closure flap in the direction of said outlet end of the conduit means.

* * * * *